US011932506B2

(12) United States Patent
Kanazawa et al.

(10) Patent No.: US 11,932,506 B2
(45) Date of Patent: Mar. 19, 2024

(54) SHEET STACKING DEVICE, COUNTER-EJECTOR, AND CARTON FORMER

(71) Applicant: MITSUBISHI HEAVY INDUSTRIES MACHINERY SYSTEMS, LTD., Hyogo (JP)

(72) Inventors: Hiroyuki Kanazawa, Tokyo (JP); Yoshitomo Noda, Tokyo (JP); Tomohiro Akaki, Tokyo (JP); Koshi Tanimoto, Tokyo (JP); Hideaki Nagai, Tokyo (JP); Makoto Shimohatsubo, Hyogo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 211 days.

(21) Appl. No.: 17/426,667

(22) PCT Filed: Dec. 11, 2019

(86) PCT No.: PCT/JP2019/048572
§ 371 (c)(1),
(2) Date: Jul. 29, 2021

(87) PCT Pub. No.: WO2020/158204
PCT Pub. Date: Aug. 6, 2020

(65) Prior Publication Data

US 2022/0106146 A1 Apr. 7, 2022

(30) Foreign Application Priority Data

Feb. 1, 2019 (JP) ................................ 2019-017404

(51) Int. Cl.
*B65H 31/10* (2006.01)
*B31B 50/94* (2017.01)
(Continued)

(52) U.S. Cl.
CPC ............ *B65H 31/10* (2013.01); *B31B 50/94* (2017.08); *B65H 29/247* (2013.01); *B65H 31/34* (2013.01);
(Continued)

(58) Field of Classification Search
CPC ...... B65H 31/10; B65H 29/247; B65H 35/00; B65H 33/00; B65H 2405/112
See application file for complete search history.

(56) References Cited

U.S. PATENT DOCUMENTS 4,702,468 A 10/1987 Pollich
4,878,659 A * 11/1989 Besemann ......... B65H 31/3054 414/790.1
(Continued)

FOREIGN PATENT DOCUMENTS

CN 1847997 A 10/2006
CN 103287913 A 9/2013
(Continued)

OTHER PUBLICATIONS

Office Action for Chinese Application No. 2019800899545.5 dated Aug. 26, 2022; 11pp.
(Continued)

*Primary Examiner* — Howard J Sanders
(74) *Attorney, Agent, or Firm* — HAUPTMAN HAM, LLP

(57) ABSTRACT

The present invention provides a sheet stacking device, a counter-ejector, and a carton former and is provided with: a hopper unit that stacks cardboard boxes; feed rollers that feed a cardboard box to the hopper unit; a first blower device that blows air from above the hopper unit toward the cardboard box fed by the feed rollers; and a second blower device that blows air between the cardboard box stacked in the hopper unit and the cardboard box fed by the feed roller.

14 Claims, 11 Drawing Sheets

(51) Int. Cl.

| | |
|---|---|
| ***B65H 29/24*** | (2006.01) |
| ***B65H 31/34*** | (2006.01) |
| ***B65H 33/00*** | (2006.01) |
| *B31B 120/30* | (2017.01) |

(52) U.S. Cl.

CPC ........ *B65H 33/00* (2013.01); *B31B 2120/302* (2017.08); *B65H 2301/541* (2013.01)

(56) References Cited

U.S. PATENT DOCUMENTS

| | | | | |
|---|---|---|---|---|
| 5,493,104 | A * | 2/1996 | Wilson .................. | B65H 31/32 271/189 |
| 7,522,874 | B2 | 4/2009 | Suzuki | |
| 7,941,088 | B2 | 5/2011 | Suzuki | |
| 8,936,240 | B2 | 1/2015 | Hoshino et al. | |
| 9,260,264 | B2 | 2/2016 | Hoshino et al. | |
| 9,561,927 | B2 | 2/2017 | Hoshino et al. | |
| 10,407,822 | B2 * | 9/2019 | McCabe ................. | B65H 5/08 |
| 10,562,729 | B2 | 2/2020 | Ando et al. | |
| 2006/0228139 | A1 | 10/2006 | Suzuki | |
| 2009/0169224 | A1 | 7/2009 | Suzuki | |
| 2011/0170883 | A1 | 7/2011 | Suzuki | |
| 2013/0228965 | A1 | 9/2013 | Hoshino et al. | |
| 2014/0148321 | A1 | 5/2014 | Hatano et al. | |
| 2014/0203501 | A1 | 7/2014 | Hoshino et al. | |
| 2016/0185552 | A1 | 6/2016 | Hoshino et al. | |
| 2018/0015682 | A1 | 1/2018 | Iori et al. | |
| 2018/0229958 | A1 | 8/2018 | Ando et al. | |

FOREIGN PATENT DOCUMENTS

| | | | |
|---|---|---|---|
| CN | 107922137 | A | 4/2018 |
| CN | 108002095 | A | 5/2018 |
| CN | 207810871 | U | 9/2018 |
| DE | 2425097 | A1 | 11/1975 |
| DE | 7534635 | U | 11/1978 |
| DE | 19816314 | C2 | 12/2002 |
| EP | 2671713 | A1 | 12/2013 |
| JP | S628262 | U | 1/1987 |
| JP | S63192363 | U | 12/1988 |
| JP | 2004217334 | A | 8/2004 |
| JP | 2012157994 | A | 8/2012 |
| JP | 2016183013 | A | 10/2016 |
| WO | 2016129348 | A1 | 8/2016 |

OTHER PUBLICATIONS

Extended European Search Report of European Application No. 19912403.3 dated Dec. 5, 2022; 7pp.

International Search Report and Written Opinion issued in corresponding International Application No. PCT/JP2019/048572; dated Mar. 3, 2020; 15 pgs.

* cited by examiner

SHEET STACKING DEVICE, COUNTER-EJECTOR, AND CARTON FORMER

RELATED APPLICATIONS

The present application is a National Phase of International Application Number PCT/JP2019/048572 filed Dec. 11, 2019 and claims priority to Japanese Application Number 2019-017404 filed Feb. 1, 2019.

TECHNICAL FIELD

The present invention relates to a sheet stacking device that stacks produced flat corrugated boxes to form a stack, a counter ejector to which the sheet stacking device is applied and which collects and counts corrugated sheets to discharge the corrugated sheets in a batch, and a box making machine to which the counter ejector is applied.

BACKGROUND ART

Typical box making machines process sheet materials (for example, corrugated sheets), thereby producing a box member (corrugated box), and are constituted of a feeding section, a printing section, a slotter creaser section, a die cutting section, a folder gluer section, and a counter ejector section. The feeding section feeds corrugated sheets stacked on a table one by one to send the corrugated sheets to the printing section at a constant speed. The printing section has a printing unit and performs printing on a corrugated sheet. The slotter creaser section forms creasing lines serving as folding lines on the corrugated sheet on which printing is performed, and processes grooves for forming flaps and gluing margin strips for joining. The die cutting section performs punching for hand holes on the corrugated sheet in which the creasing lines, the grooves, and the gluing margin strips are formed. The folder gluer section applies glue to the gluing margin strips, performs folding along the creasing lines, and joining the gluing margin strips while moving the corrugated sheet in which the creasing lines, the grooves, the gluing margin strips, and the hand holes are processed, thereby producing a flat corrugated box. The counter ejector section stacks corrugated boxes obtained by the corrugated sheets being folded and glued, and then sorts and discharges the corrugated boxes in a batch of a predetermined number of boxes.

The counter ejector section of such a box making machine is disposed at a most downstream part of the box making machine, collects, counts, and stacks the produced flat corrugated boxes to discharge the corrugated boxes in a batch of a predetermined number of boxes. This counter ejector section has a hopper unit in which corrugated boxes are stacked, stops the movement of a corrugated box, which is fed above the hopper unit in a horizontal state by feeding rolls, in a transfer direction, and causes blowing devices, which are disposed on a front end and a rear end of the hopper unit, to blow air to the corrugated box to drop the corrugated box in the hopper unit and stack a predetermined number of boxes. As such a box making machine, for example, there is one described in the following PTL.

CITATION LIST

Patent Literature

[PTL 1] Japanese Unexamined Patent Application Publication No. 2012-157994

SUMMARY OF INVENTION

Technical Problem

In recent years, in such a box making machine, speeding-up has progressed. However, if the production rate is increased, the behavior of a corrugated box becomes unstable and it becomes difficult to stack the corrugated boxes in order in the hopper unit in a correct posture. In the above-described PTL 1, a ledge receives and collects the corrugated box fed by the feeding rolls, and delivers to an elevator. When a predetermined number of corrugated boxes has reached and a stack is formed, the elevator lowers to discharge the stack. The ledge moves to a position for receiving the next corrugated box with the lowering of the elevator. When the elevator is lowered with the stack, the feeding rolls feed the next corrugated box to the hopper unit, and the ledge receives the corrugated box. At this time, when the elevator is lowered, the volume of an upper space of the elevator increases, thereby generating a negative pressure here. The generated negative pressure acts on the corrugated box fed from the feeding rolls to the hopper unit, and the behavior of the corrugated box becomes unstable, causing difficulty in high-precision collection of the corrugated box.

The present invention is to solve the above-described problems, and an object thereof is to provide a sheet stacking device, a counter ejector, and a box making machine capable of accurately stacking a box making sheet material in a predetermined posture by stabilizing the behavior of the box making sheet material fed from feeding rolls.

Solution to Problem

According to the present invention, in order to achieve the object, there is provided a sheet stacking device including a hopper unit in which a box making sheet material is stacked, a feeding unit that feeds the box making sheet material to the hopper unit, a first blowing device that blows air from above the hopper unit toward the box making sheet material fed by the feeding unit, and a second blowing device that blows air between the box making sheet material stacked in the hopper unit and the box making sheet material fed by the feeding unit.

Therefore, when feeding the box making sheet material above the hopper unit by the feeding unit, the second blowing device blows air between the box making sheet material stacked in the hopper unit and the box making sheet material fed by the feeding unit. Then, the air blown from the second blowing device prevents the box making sheet material fed above the hopper unit from being lowered early, and is stacked in the hopper unit while maintaining a stable posture. As a result, the box making sheet material can be accurately stacked in a predetermined posture by stabilizing the behavior of the box making sheet material being fed from the feeding unit.

In the sheet stacking device of the present invention, a control device that operates and controls the first blowing device and the second blowing device is provided, a receiving table for receiving and stacking a box making sheet material is disposed in the hopper unit, the receiving table is capable of being raised and lowered by a lifting device, and the control device operates the second blowing device when the receiving table on which the box making sheet material is stacked is lowered by a lifting device.

Therefore, when the receiving table for receiving and stacking the box making sheet material is lowered, the volume of an upper space of the receiving table increases, and a negative pressure is generated in the hopper unit. However, at this time, since the control device operates the second blowing device to blow air, the negative pressure of the upper space is eliminated, and thus the behavior of the box making sheet material fed above the hopper unit can be stabilized.

In the sheet stacking device of the present invention, the receiving table is used for stacking a predetermined number of the box making sheet materials, which is set in advance, and the control device operates the second blowing device when at least a first box making sheet material, among the predetermined number of box making sheet materials, is fed to the hopper unit by the feeding unit.

Therefore, when feeding the first box making sheet material to the hopper unit by the feeding unit, the receiving table on which the predetermined number of box making sheet materials are stacked is lowered and a negative pressure is generated. For that reason, the negative pressure generated in the hopper unit is eliminated by operating the second blowing device when the first box making sheet material is fed to the hopper unit, and thus the behavior of the box making sheet material fed above the hopper unit can be stabilized.

In the sheet stacking device of the present invention, the receiving table is used for stacking the predetermined number of box making sheet materials, which is set in advance, and the control device stops operation of the second blowing device when at least a last box making sheet material, among the predetermined number of box making sheet materials, is fed to the hopper unit by the feeding unit.

Therefore, when the last box making sheet material is fed to the hopper unit by the feeding unit, it is necessary for a peripheral device to prepare for receiving the first box making sheet material in the next step. For that reason, unnecessary air blowing from the second blowing device is stopped by stopping the operation of the second blowing device when the last box making sheet material is fed to the hopper unit, and thus contact between the peripheral device and the last box making sheet material can be prevented.

In the sheet stacking device of the present invention, when feeding the box making sheet material to the hopper unit by the feeding unit, the control device starts operation of the second blowing device if a tip portion of the box making sheet material reaches the hopper unit, and terminates the operation of the second blowing device if the tip portion of the box making sheet material reaches an intermediate position of the hopper unit in a feeding direction of the box making sheet material.

Therefore, since the second blowing device is operated while the tip portion of the box making sheet material reaches the intermediate position after reaching the hopper unit, the behavior of the box making sheet material can be appropriately stabilized by appropriately eliminating a generated negative pressure and stopping the unnecessary blowing of the air.

In the sheet stacking device of the present invention, the second blowing device blows air toward the box making sheet material fed by the feeding unit.

Therefore, since the second blowing device blows air toward the box making sheet material fed by the feeding unit, the behavior of the box making sheet material can be stabilized at the time of lowering by blowing air to a lower surface of the box making sheet material that falls in the hopper unit.

In the sheet stacking device of the present invention, the second blowing device is provided on an upstream side of the hopper unit in a feeding direction of the box making sheet material.

Therefore, since the second blowing device is provided on the upstream side of the hopper unit, a lower space of the feeding unit can be effectively used as a disposition space for the second blowing device, and an increase in the size of the device can be prevented.

In the sheet stacking device of the present invention, a correction plate that presses a rear end of the box making sheet material in the hopper unit in a transfer direction is provided to be reciprocable along the feeding direction of the box making sheet material, and the second blowing device is provided on the correction plate.

Therefore, since the second blowing device is provided on the reciprocable correction plate, air can be efficiently blown from the second blowing device to the box making sheet material without receiving an effect of reciprocation of the correction plate.

In the sheet stacking device of the present invention, a through-hole that faces an air blowing direction of the second blowing device is formed in the correction plate.

Therefore, since the through-hole that faces the air blowing direction of the second blowing device is formed in the correction plate, without air from the second blowing device being blocked by the correction plate, the air can be preferably blown to the box making sheet material from the second blowing device.

In the sheet stacking device of the present invention, a cutout portion that faces an air blowing direction of the second blowing device is formed in the correction plate.

Therefore, since the cutout portion that faces the air blowing direction of the second blowing device is formed in the correction plate, without air from the second blowing device being blocked by the correction plate, the air can be preferably blown to the box making sheet material from the second blowing device.

In the sheet stacking device of the present invention, the second blowing device is provided on at least one side of the hopper unit in a horizontal direction intersecting a feeding direction of the box making sheet material.

Therefore, since the second blowing device is provided on the side of the hopper unit, the second blowing device can be disposed at a better position, and the disposition space can be effectively used.

In the sheet stacking device of the present invention, a side end positioning member that positions a side end of the box making sheet material in the hopper unit is provided to be movable along the horizontal direction intersecting the feeding direction of the box making sheet material, and the second blowing device is provided on the side end positioning member.

Therefore, since the second blowing device is provided on the movable side end positioning member, even if the position of the side end positioning member is adjusted by changing the size of the box making sheet material, the position of the second blowing device is simultaneously adjusted, and operability can be improved.

In the sheet stacking device of the present invention, the receiving table is used for stacking a predetermined number of the box making sheet materials, which is set in advance, and the control device operates the first blowing device if a tip portion of the box making sheet material reaches an intermediate position of the hopper unit in a feeding direction of the box making sheet material when feeding the box making sheet material to the hopper unit by the feeding unit and operates the first blowing device if the tip portion of the box making sheet material reaches the hopper unit when feeding a last box making sheet material, among the predetermined number of box making sheet materials, to the hopper unit by the feeding unit.

Therefore, since the first blowing device is operated if the tip portion of the box making sheet material reaches the intermediate position of the hopper unit, air from the first blowing device presses down the rear end of the box making sheet material. Consequently, contact with the subsequent box making sheet material is prevented, and the box making sheet material can be accurately stacked in the hopper unit. In addition, when the last box making sheet material is fed to the hopper unit by the feeding unit, it is necessary for the peripheral device to prepare for receiving the first box making sheet material in the next step. For that reason, as the first blowing device is operated if the tip portion of the last box making sheet material reaches the hopper unit, the last box making sheet material is lowered at an early stage and is stacked in the hopper unit due to air from the first blowing device, and contact between the peripheral device and the last box making sheet material can be prevented.

According to the present invention, there is provided a counter ejector including the sheet stacking device, in which after counting and stacking the box making sheet materials, the box making sheet materials are sorted and discharged in a batch of a predetermined number of the box making sheet materials.

Therefore, in the sheet stacking device, since the second blowing device blows air between the box making sheet material stacked in the hopper unit and the box making sheet material fed by the feeding unit, air blown from the second blowing device prevents the box making sheet material fed above the hopper unit from being lowered early, and the box making sheet material is stacked on a hopper while maintaining a stable posture. As a result, the box making sheet material can be accurately stacked in a predetermined posture by stabilizing the behavior of the box making sheet material being fed from the feeding roll.

According to the present invention, there is provided a box making machine including a feeding section that supplies a box making sheet material, a printing section that performs printing on the box making sheet material, a slotter creaser section that performs creasing and performs grooving on a surface of the box making sheet material, a folder gluer section that folds the box making sheet material and joins ends thereof together to form a box member, and a counter ejector section that discharges every predetermined number of the box members after being stacked while being counted. The above counter ejector is applied as the counter ejector section.

Therefore, printing is performed on the box making sheet material fed from the feeding section by the printing section, creasing and grooving are performed by the slotter creaser section, folding and joining ends thereof together to form the box member are performed by the folder gluer section, and the box member is stacked while being counted by the counter ejector section. At this time, in the counter ejector section, when feeding the box making sheet material above the hopper unit by the feeding unit, the second blowing device blows air between the box making sheet material stacked in the hopper unit and the box making sheet material fed by the feeding unit. Then, the air blown from the second blowing device prevents the box making sheet material fed above the hopper unit from being lowered early, and the box making sheet material is stacked in the hopper while maintaining a stable posture. As a result, the box making sheet material can be accurately stacked in a predetermined posture by stabilizing the behavior of the box making sheet material being fed from the feeding roll.

ADVANTAGEOUS EFFECTS OF INVENTION

With the sheet stacking device, the counter ejector, and the box making machine of the present invention, the box making sheet material can be accurately stacked in a predetermined posture by stabilizing the behavior of the box making sheet material fed from the feeding roll.

DESCRIPTION OF EMBODIMENTS

Preferred embodiments of a sheet stacking device, a counter ejector, a box making machine related to the present invention will be described below in detail with reference to the accompanying drawings. In addition, the present invention is not limited to the embodiments and includes those configured by combining respective embodiments in a case where there are a plurality of embodiments.

First Embodiment

Figure 1:
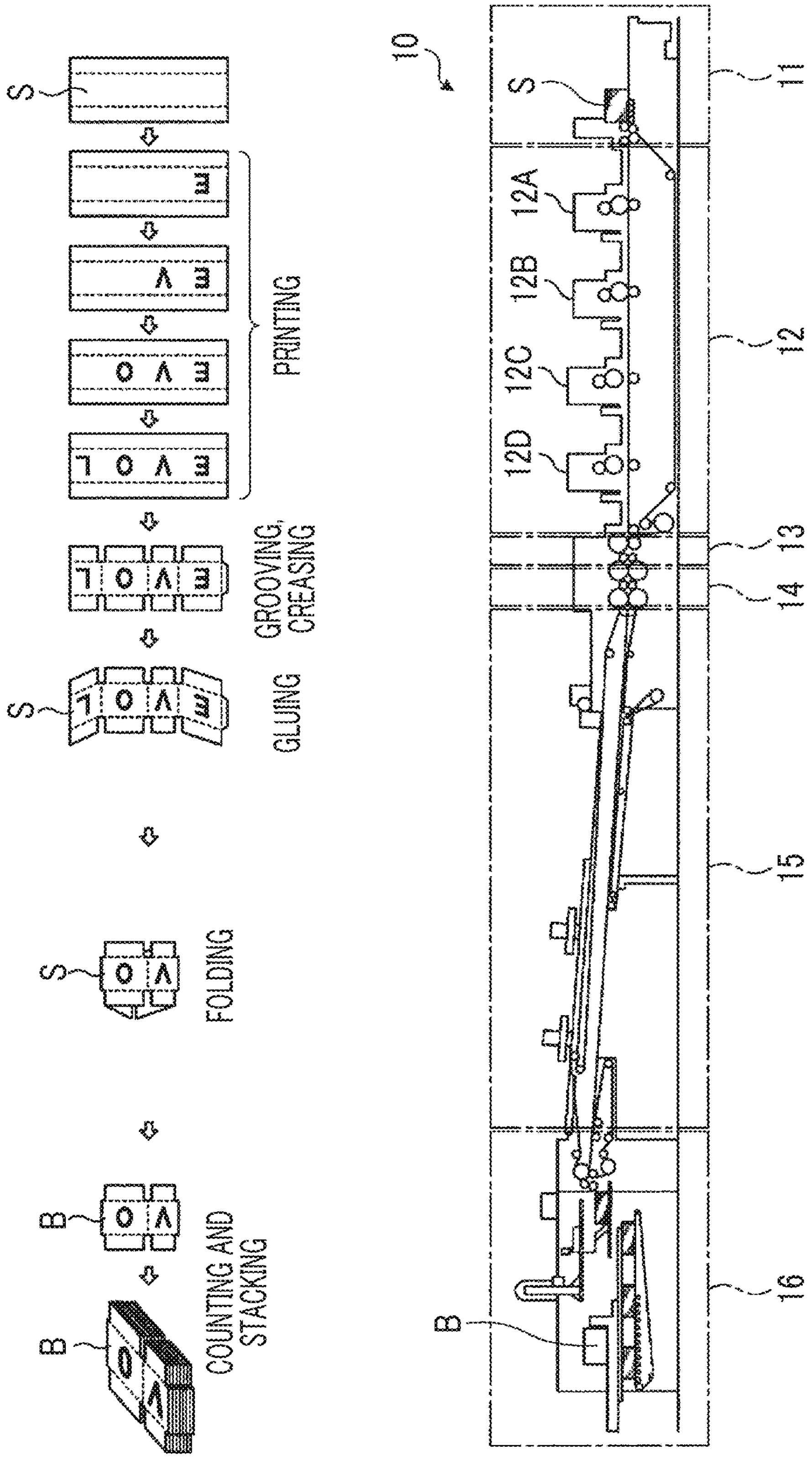
FIG. 1 is a schematic configuration view illustrating a box making machine of a first embodiment.

FIG. 1 is a schematic configuration view illustrating the box making machine of a first embodiment.

In the first embodiment, as illustrated in FIG. 1, a box making machine 10 produces a corrugated box (box making sheet material) B by processing a corrugated sheet S. The box making machine 10 is constituted of a feeding section

11, a printing section 12, a slotter creaser section 13, a die cutting section 14, a folder gluer section 15, and a counter ejector section 16 that are linearly disposed in a direction in which the corrugated sheet S and the corrugated box B are transferred.

In the feeding section 11, a number of plate-shaped corrugated sheets S are carried in a stacked state, and the corrugated sheets S are fed one by one and are sent to the printing section 12 at a constant speed. The printing section 12 performs multi-colored printing (four-color printing in the first embodiment) on a surface of each corrugated sheet S. The printing section 12 has four printing units 12A, 12B, 12C, and 12D disposed in series, and is capable of performing printing on the surface of the corrugated sheet S using four ink colors. The slotter creaser section 13 performs creasing and performs grooving on the corrugated sheet S.

The die cutting section 14 performs punching for hand holes on the corrugated sheet S. The folder gluer section 15 folds the corrugated sheet S while moving the corrugated sheet S in a transfer direction, and joins both ends thereof in a width direction together to form the flat corrugated box B. The counter ejector section 16 stacks the corrugated boxes B produced by the folder gluer section 15 while counting the corrugated boxes B, and then sorts and discharges the corrugated boxes B in a batch of a predetermined number of boxes.

Figure 2:
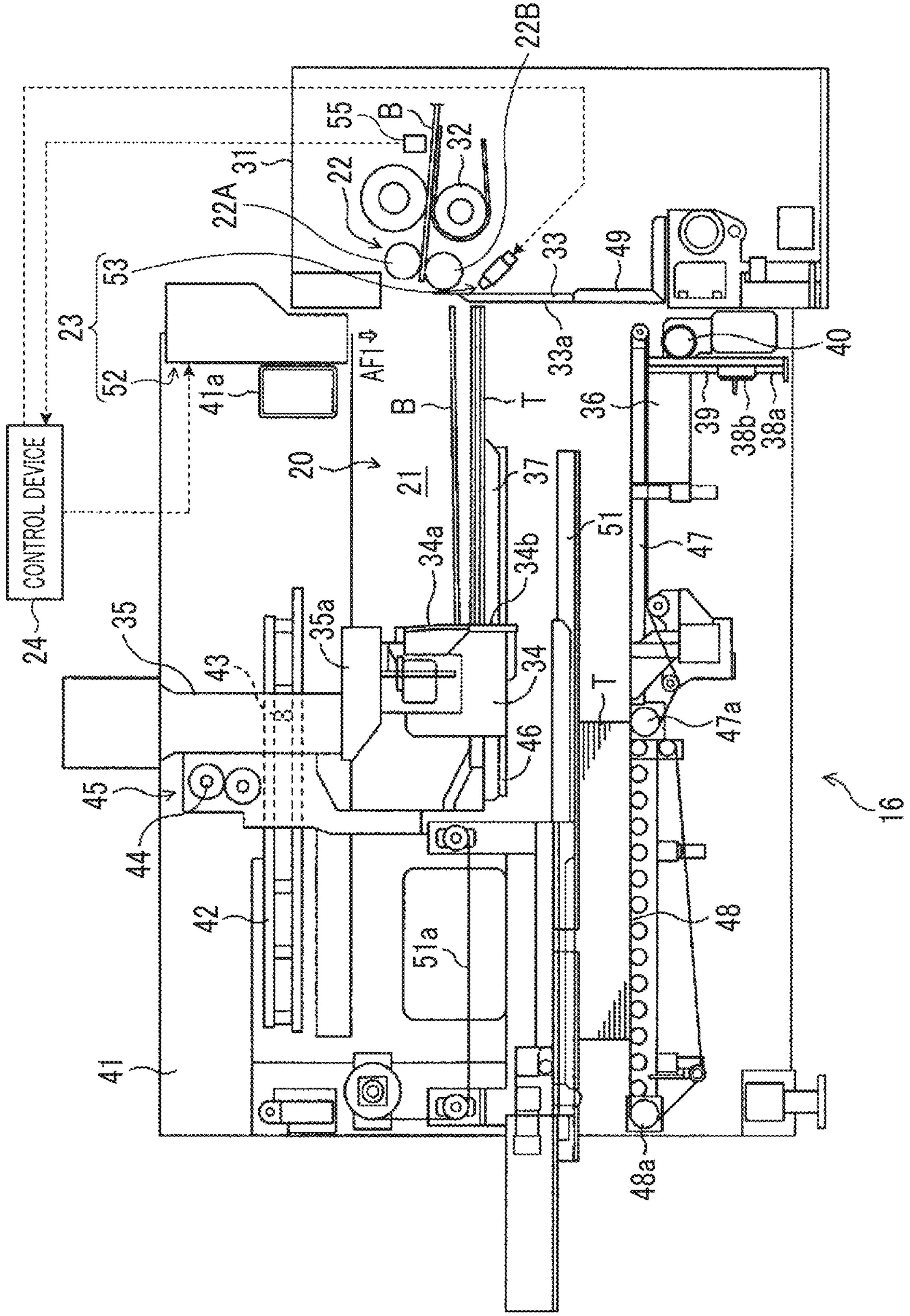
FIG. 2 is a schematic configuration view illustrating a counter ejector including the sheet stacking device of the first embodiment.

FIG. 2 is a schematic configuration view illustrating the counter ejector including the sheet stacking device of the first embodiment.

In the first embodiment, as illustrated in FIG. 2, the counter ejector section (counter ejector) 16 has a sheet stacking device 20 of the first embodiment. The sheet stacking device 20 includes a hopper unit 21 for stacking the flat corrugated boxes B, a feeding roll (feeding unit) 22 for feeding the corrugated box B to the hopper unit 21, a blowing device 23 for pressing the corrugated box B downward to be transferred in the hopper unit 21, and a control device 24 for operating and controlling the blowing device 23.

Frames 31 are respectively erected on both sides, in a machine width direction, of an inlet part of the counter ejector section 16, and an outlet conveyor roller 32 of the folder gluer section 15 (see FIG. 1) and a pair of upper and lower ejection rolls 22 are attached to the frames 31. The feeding roll 22 has an upper ejection roll 22A and a lower ejection roll 22B having a rotation axis in a horizontal direction orthogonal to the transfer direction of the corrugated box B, and feeds the vertically interposed corrugated box B to a transfer passage along the horizontal direction.

In the frames 31, a spanker (correction plate) 33 that presses a rear end of a stack (in which a predetermined number of corrugated boxes B are stacked) T is provided below the feeding rolls 22. The spanker 33 is provided with an abutting surface 33*a* against which a rear end of the corrugated box B abuts, and a part below an intermediate part of the abutting surface 33*a* is provided in a vertical direction. However, an upper end of an upper part of the abutting surface 33*a* is inclined so as to shift to an upstream side in the transfer direction of the corrugated box B.

In the hopper unit 21, a space where the stack T is formed as the corrugated boxes B are stacked is provided below an outlet side of the feeding rolls 22, and this space serves as the hopper unit 21. The feeding rolls 22 feed the corrugated box B toward an upper space of the hopper unit 21.

The hopper unit 21 faces a downstream side in the transfer direction of the corrugated box B, and a flexible front stopper 34, which stops the corrugated box B discharged from the folder gluer section 15 while decelerating the corrugated box B, is supported so as to be movable forward and backward in the transfer direction. That is, the front stopper 34 is provided so as to be movable forward and backward in the transfer direction of the corrugated box B by a motor (not illustrated) with respect to a supporting part 35*a* of a ledge support 35. The front stopper 34 has a flexible stop plate 34*a* formed of a flexible material, and is capable of stopping the movement of the corrugated box B in the transfer direction while decelerating the corrugated box B and being elastically deformed itself when a front end of the corrugated box B abuts thereagainst. However, a high-rigidity stop plate 34*b* formed of, for example, a high-rigidity material, such as metal, is provided below the flexible stop plate 34*a*, and the flexible stop plate 34*a* is capable of restricting the movement of the stack T at a front edge of the stack T as the rear end of the stack T is pressed by the spanker 33 with the reciprocation of the spanker 33.

An elevator 36 is provided below the hopper unit 21, and the stack T collected from a ledge 37 to the middle is delivered to the hopper unit 21, and the hopper unit 21 receives the corrugated box B that has hit the front stopper 34 and has fallen on the stack T, and collects the corrugated boxes B to form the stack T of a predetermined number of boxes. The elevator 36 is horizontally disposed below a portion slightly on the downstream side of the feeding rolls 22 in the transfer direction, is supported by a supporting shaft 39 provided on a rack 38*a*, and is configured so as to be reciprocable in an upward-downward direction by a driving mechanism consisting of the rack 38*a*, a pinion 38*b* to mesh with the rack 38*a*, and a servo motor 40 combined with the pinion 38*b*.

Side frames 41 are respectively provided on both sides in the machine width direction on the downstream side of the hopper unit 21 in the transfer direction of the corrugated box B in the counter ejector section 16, rails 42 are horizontally provided in the side frames 41, and the ledge support 35 is supported by the rails 42 on both sides so as be capable of traveling. That is, the ledge support 35 is provided with a roller 43 that travels on each rail 42, a pinion (not illustrated) that meshes with a rack (not illustrated) provided along the rail 42, and a ledge back-and-forth servo motor 44 that rotationally drives this pinion. For that reason, the ledge support 35 can be moved forward and backward in the transfer direction by driving the ledge back-and-forth servo motor 44 to normally and reversely rotate the ledge back-and-forth servo motor 44.

The ledge support 35 is provided with the ledge 37 that horizontally extends via a lifting mechanism 45. Although not illustrated, the lifting mechanism 45 is constituted of a rack-and-pinion mechanism, a ledge lifting servo motor that rotationally drives this pinion, and the like, and the ledge support 35 is capable of being raised and lowered by the normal and reverse rotation of the servo motor.

The ledge 37 receives the corrugated box B that has abutted against the front stopper 34 and has fallen therefrom, and collects the corrugated boxes B to form the stack T. The stack T is delivered to the elevator 36 while being formed. Thereafter, when the corrugated boxes B are further collected on the elevator 36 and the stack T reaches a set number of boxes, the elevator 36 is replaced to receive the corrugated box B in order to operate again and to form the following stack T.

A press bar 46 that presses the stack T is supported on the ledge 37 so as to be capable of being raised and lowered by a lifting mechanism (not illustrated). This lifting mechanism is also constituted of the rack-and-pinion mechanism and a press bar lifting servo motor that rotationally drives this pinion, and the press bar 46 is capable of being raised and lowered by the normal and reverse rotation of the servo motor.

A lower conveyor 47 is provided at the same height level as an upper surface of the elevator 36 when the elevator 36 has lowered downward to the maximum, and a discharge conveyor 48 is further provided at the same height position as the lower conveyor 47 on the downstream side of the lower conveyor 47. The lower conveyor 47 and the discharge conveyor 48 are respectively driven by a servo motor 47*a* for the lower conveyor, and a servo motor 48*a* for the discharge conveyor. The lower conveyor 47 is installed to enter the back of the elevator 36 so that an inlet tip position is located sufficiently close to a pusher 49 so as to be capable of receiving even the corrugated box B of a minimum length (transfer direction length is a minimum).

An upper conveyor 51, which pinches the stack T together with the lower conveyor 47 and the discharge conveyor 48, is supported above the lower conveyor 47 and the discharge conveyor 48 such that the position thereof in a height direction is capable of being adjusted via a moving mechanism 51*a*. Additionally, the upper conveyor 51 is also movable forward and backward in the transfer direction, and is configured so as to move up to a certain distance from the front stopper 34 in conjunction with the front stopper 34 in accordance with the corrugated box B.

The blowing device 23 that blows air AF1 and AF2 to the corrugated box B fed from the feeding rolls 22 is provided on the periphery of the hopper unit 21. The blowing device 23 is constituted of a first blowing device 52 and a second blowing device 53. The first blowing device 52 is disposed above the upstream side of the hopper unit 21 in the transfer direction of the corrugated box B as being fixed to a beam 41*a* supported by both side frames 41. The first blowing device 52 presses the corrugated box B downward with the air AF1 by blowing the air AF1 toward an upper surface of the corrugated box B fed to the hopper unit 21 by the feeding rolls 22.

The second blowing device 53 is disposed on the upstream side of the hopper unit 21 in the transfer direction of the corrugated box B as being fixed to the spanker 33 on a frame 31 side. The second blowing device blows the air AF2 to a space portion between the corrugated box B stacked in the hopper unit 21 and the corrugated box B fed to the hopper unit 21 by the feeding rolls 22. In this case, the second blowing device 53 blows the air AF2 toward a lower surface of the corrugated box B fed to the hopper unit 21 by the feeding rolls 22.

Further, the first blowing device 52 and the second blowing device 53 constituting the blowing device 23 can be operated and controlled by the control device 24. That is, a position sensor 55 for detecting a transfer position of the corrugated box B is provided on the upstream side of the outlet conveyor roller 32 of the folder gluer section (see FIG. 1). The control device 24 calculates the transfer position of the corrugated box B based on the detecting results from the position sensor 55 and a speed at which the corrugated box B is transferred by the feeding rolls 22, and controls the operation of the first blowing device 52 and the second blowing device 53 depending on the transfer position of the corrugated box B.

Figure 3:
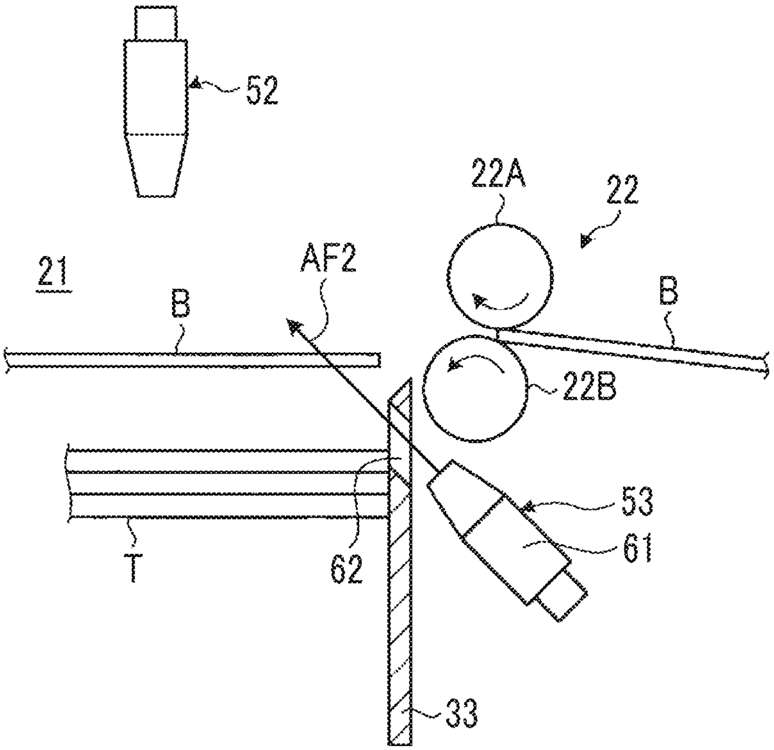
FIG. 3 is a side view illustrating a second blowing device.

Here, the second blowing device 53 will be described in detail. FIG. 3 is a side view illustrating the second blowing device, and FIG. 4 is a rear view illustrating the second blowing device.

Figure 4:
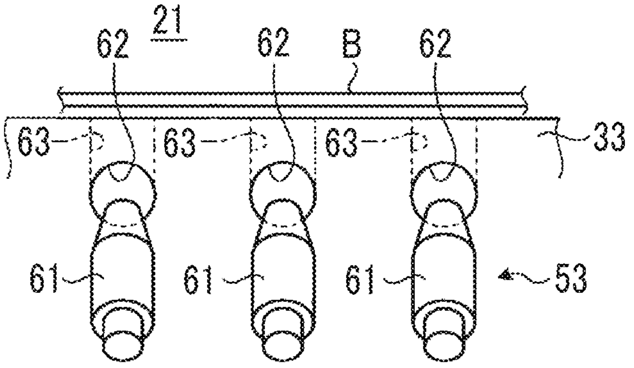
FIG. 4 is a rear view illustrating the second blowing device.

As illustrated in FIGS. 3 and 4, the second blowing device 53 is provided on the upstream side of the hopper unit 21 in a feeding direction of the corrugated box B. The frames 31 (see FIG. 2) are provided such that the spanker 33 that presses the rear end of the stack T of the corrugated boxes B is reciprocable along the feeding direction of the corrugated box B. The second blowing device 53 is provided adjacent to the spanker 33.

The second blowing device 53 is constituted of a plurality of spraying nozzles 61. The plurality of spraying nozzles 61 are disposed on an opposite side to the hopper unit 21 with respect to the spanker 33 with predetermined intervals in the horizontal direction orthogonal to the feeding direction of the corrugated box B. The plurality of spraying nozzles 61 are supported by, for example, the frames 31 via a bracket (not illustrated). In addition, the plurality of spraying nozzles 61 are disposed such that a spraying direction of the air AF2 is inclined upward at a predetermined angle with respect to the horizontal direction and the vertical direction. On the other hand, in the spanker 33, a plurality of through-holes 62 are formed to face a blowing direction of the air AF2 from the plurality of spraying nozzles 61.

Although not illustrated, the plurality of spraying nozzles 61 are connected to a compressor via a pipe, and blow the air AF2 through the plurality of through-holes 62. The plurality of spraying nozzles 61 blow the air AF2 to the space portion between the corrugated box B stacked in the hopper unit 21 and the corrugated box B fed to the hopper unit 21 by the feeding rolls 22. In addition, since the plurality of spraying nozzles 61 are disposed in an inclined manner, the spraying direction of the air AF2 is directed to the corrugated box B fed to the hopper unit 21, and the air AF2 is blown toward the lower surface of the corrugated box B located above the hopper unit 21.

Here, the plurality of through-holes 62 are formed in the spanker 33 to face the blowing direction of the air AF2 from the plurality of spraying nozzles 61, but are not limited to this configuration. For example, as shown by two-dot chain lines in FIG. 4, a plurality of cutout portions 63 may be formed in the spanker 33 to face the blowing direction of the air AF2 from the plurality of spraying nozzles 61. Since the plurality of cutout portions 63 are formed along a vertical direction of the spanker 33, the air AF2 from the spraying nozzles 61 can be blown from the cutout portions 63 to a hopper unit 21 side even when the spanker 33 reciprocates.

Figure 5:
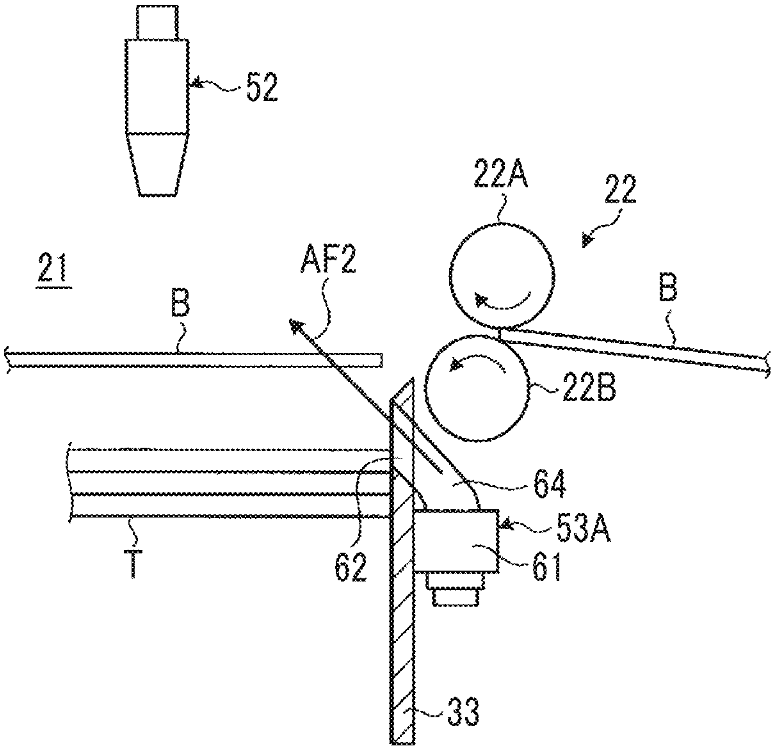
FIG. 5 is a side view illustrating a first modification example of the second blowing device.

The configuration of the second blowing device 53 is not limited to the above-described configuration. FIG. 5 is a side view illustrating a first modification example of the second blowing device, FIG. 6 is a rear view illustrating the first modification example of the second blowing device, FIG. 7 a side view illustrating a second modification example of the second blowing device, and FIG. 8 is a rear view illustrating the second modification example of the second blowing device.

Figure 6:
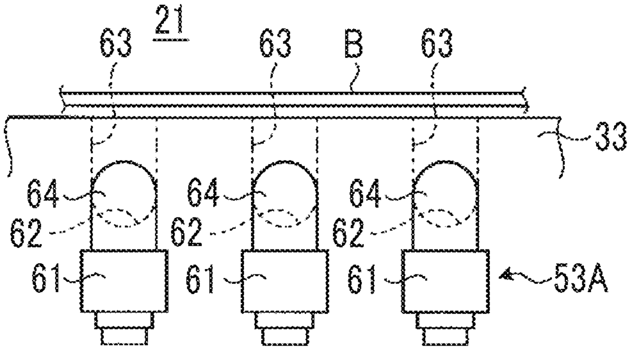
FIG. 6 is a rear view illustrating the first modification example of the second blowing device.

As illustrated in FIGS. 5 and 6, a second blowing device 53A is provided on the upstream side of the hopper unit 21 in the feeding direction of the corrugated box B, and in this case, the second blowing device 53A is provided on the spanker 33. In addition, the second blowing device 53A is constituted of the plurality of spraying nozzles 61, and the spraying nozzles 61 are disposed with predetermined intervals in the horizontal direction orthogonal to the feeding direction of the corrugated box B. In addition, although the plurality of spraying nozzles 61 are in the vertical direction and are directly fixed to the spanker 33, the spraying direction of the air AF2 is inclined upward at a predetermined angle with respect to the horizontal direction and the vertical direction as a guide 64 is provided at each spraying portion. On the other hand, in the spanker 33, the plurality of through-holes 62 are formed to face the blowing direction of the air AF2 from the plurality of spraying nozzles 61. The plurality of spraying nozzles 61 blow the air AF2 through the plurality of through-holes 62 with the guides 64.

Here, the plurality of spraying nozzles 61 are directly fixed to the spanker 33 and are provided with the guides 64 at the spraying portions, but are not limited to this configuration. For example, as illustrated in FIG. 3, the spraying nozzles 61 are disposed in an inclined manner, and may be fixed to the spanker 33 via the bracket. In this case, the guides 64 are unnecessary. In addition, as shown by two-dot chain lines in FIG. 6, the cutout portions 63 may be formed instead of the through-holes 62.

Figure 7:
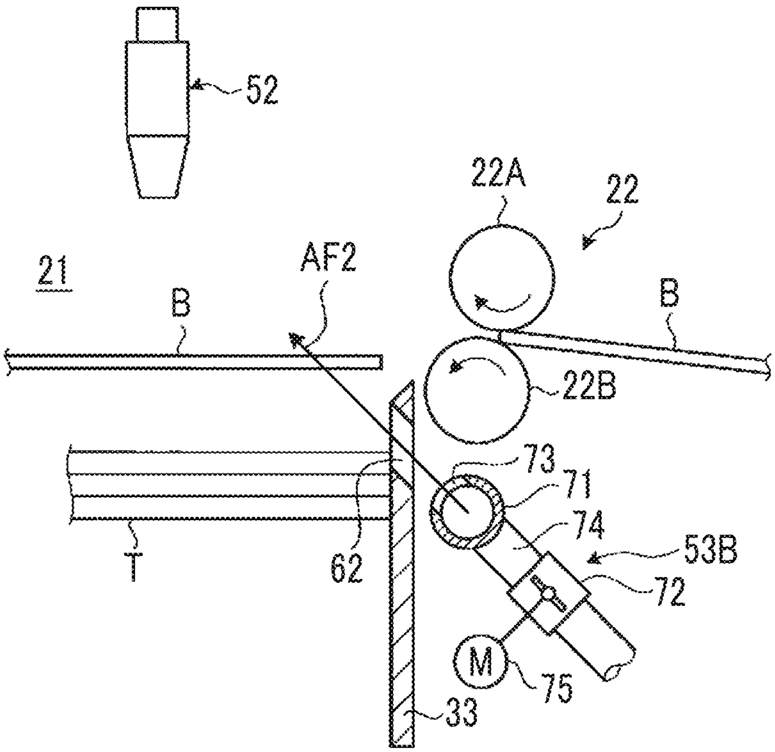
FIG. 7 is a side view illustrating a second modification example of the second blowing device.
Figure 8:
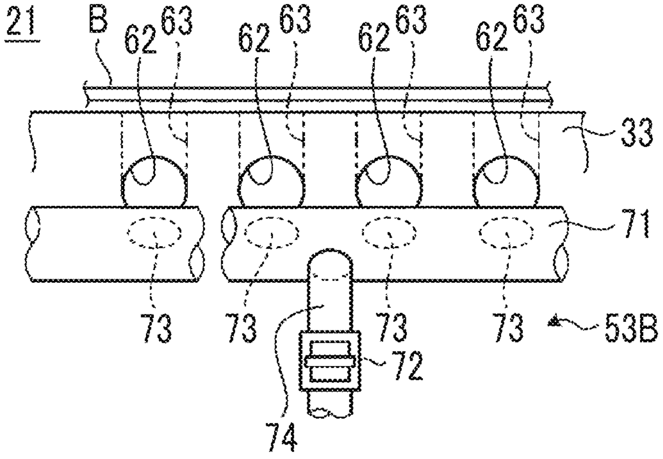
FIG. 8 is a rear view illustrating the second modification example of the second blowing device.

In addition, as illustrated in FIGS. 7 and 8, a second blowing device 53B is provided on the upstream side of the hopper unit 21 in the feeding direction of the corrugated box B, and is constituted of a spray pipe 71 and an opening and closing damper 72. The spray pipe 71 is disposed along the horizontal direction orthogonal to the feeding direction of the corrugated box B, and is fixed to the frames 31, for example, via a bracket (not illustrated). In addition, a plurality of spray ports 73 are formed in the spray pipe 71 with predetermined intervals in the horizontal direction orthogonal to the feeding direction of the corrugated box B. The plurality of spray ports 73 are formed at predetermined positions such that the spraying direction of the air AF2 is inclined upward at a predetermined angle with respect to the horizontal direction and the vertical direction.

In addition, the opening and closing damper 72 is provided on the spray pipe 71 via a connection pipe 74. A drive device 75 is capable of opening and closing the opening and closing damper 72. Although not illustrated, the opening and closing damper 72 is connected to the compressor via the pipe. On the other hand, in the spanker 33, the plurality of through-holes 62 are formed to face the blowing direction of the air AF2 from the plurality of spray ports 73. When the opening and closing damper 72 are opened, the spray pipe 71 blows the air AF2 from the plurality of spray ports 73 through the plurality of through-holes 62. The spray pipe 71 may be fixed to the spanker 33 directly or via the bracket (not illustrated), and the cutout portions 63 may be formed therein instead of the through-holes 62 as shown by two-dot chain lines in FIG. 8.

As illustrated in FIG. 2, the control device 24 operates and controls the first blowing device 52 and the second blowing device 53 of the blowing device 23 configured as described above. In the hopper unit 21, the elevator 36 and the ledge 37 are disposed as receiving tables for receiving and stacking the corrugated box B. The elevator 36 can be raised and lowered by the driving mechanism having the servo motor 40, which is a lifting device. The ledge 37 can be raised and lowered by the lifting mechanism 45, which is a lifting device. When the elevator 36 on which the corrugated box B is stacked is lowered, the control device 24 operates the second blowing device 53.

A predetermined number of corrugated boxes B, which is set in advance, are stacked on the elevator 36, and the control device 24 operates the second blowing device 53 when at least the first corrugated box B, among the predetermined number of corrugated boxes B, is fed to the hopper unit 21 by the feeding rolls 22. On the other hand, the control device 24 stops the operation of the second blowing device 53 when at least the last corrugated box B, among the predetermined number of corrugated boxes B, is fed to the hopper unit 21 by the feeding rolls 22.

In addition, when feeding the corrugated box B to the hopper unit 21 by the feeding rolls 22, the control device 24 starts the operation of the second blowing device 53 if a tip portion of the corrugated box B reaches the hopper unit 21. The control device 24 terminates the operation of the second blowing device 53 if the tip portion of the corrugated box B reaches an intermediate position of the hopper unit 21 in the feeding direction of the corrugated box B.

Further, when feeding the corrugated box B to the hopper unit 21 by the feeding rolls 22, the control device 24 operates the first blowing device 52 if the tip portion of the corrugated box B reaches the intermediate position of the hopper unit 21 in the feeding direction of the corrugated box B. On the other hand, when feeding at least the last corrugated box B, among the predetermined number of corrugated boxes B, to the hopper unit 21 by the feeding rolls 22, the first blowing device 52 is operated if the tip portion of the corrugated box B reaches the hopper unit 21.

Here, the operation of the sheet stacking device 20 of the first embodiment will be described. FIGS. 9 to 13 are schematic views illustrating the operation of the sheet stacking device. Since the timing of supplying the air AF1 and the air AF2 will be described below, brief description will be given here.

Figure 9:
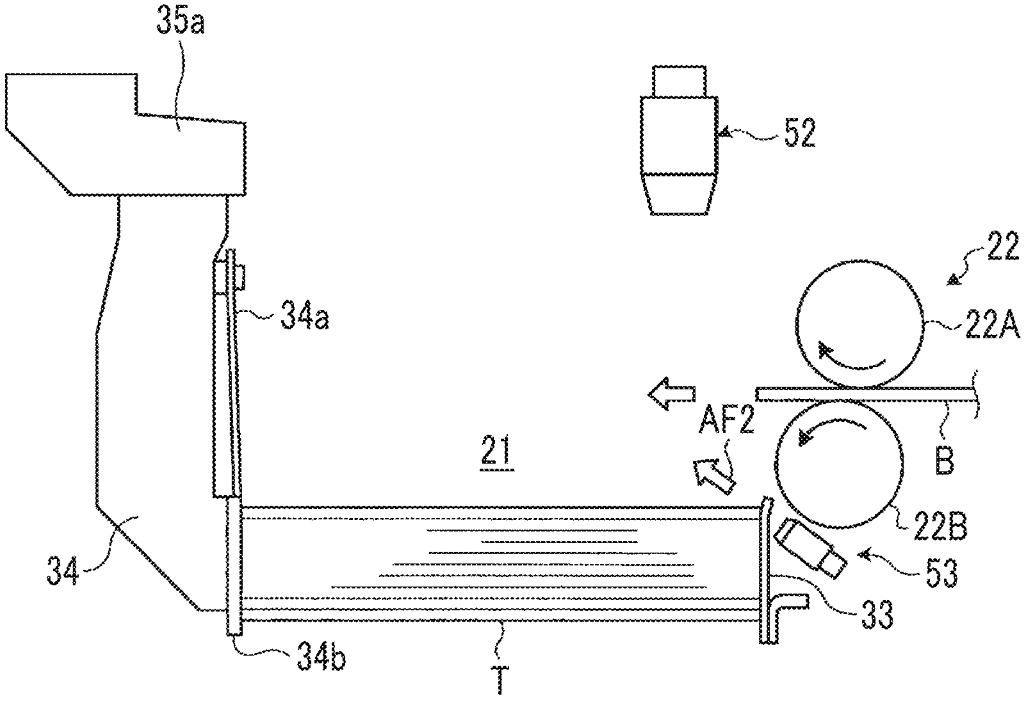
FIG. 9 is a schematic view illustrating operation of the sheet stacking device.

As illustrated in FIG. 9, the corrugated box B is transferred by the feeding rolls 22, and is stacked in the hopper unit 21. At this time, the posture of the corrugated box B is controlled by the air AF1 from the first blowing device 52 and the AF2 from the second blowing device 53.

To be more specific, the corrugated box B is fed to the upper space of the hopper unit 21 in the horizontal direction by the feeding rolls 22. Until a front end of the corrugated box B in the feeding direction of the corrugated box B enters an upper portion of the hopper unit 21, the operation of the first blowing device 52 and the second blowing device 53 is stopped. When the corrugated box B is further fed by the feeding rolls 22, the tip portion of the corrugated box B enters the upper space of the hopper unit 21. At this time, in a case where the stack T already obtained by stacking a predetermined number of corrugated boxes B is lowered with the elevator 36, the upper space of the elevator 36, that is, the volume of the hopper unit 21 increases, and a negative pressure is generated in the hopper unit 21. The generated negative pressure acts on the corrugated box B fed above the hopper unit 21, and the behavior of the corrugated box B becomes unstable.

Figure 10:
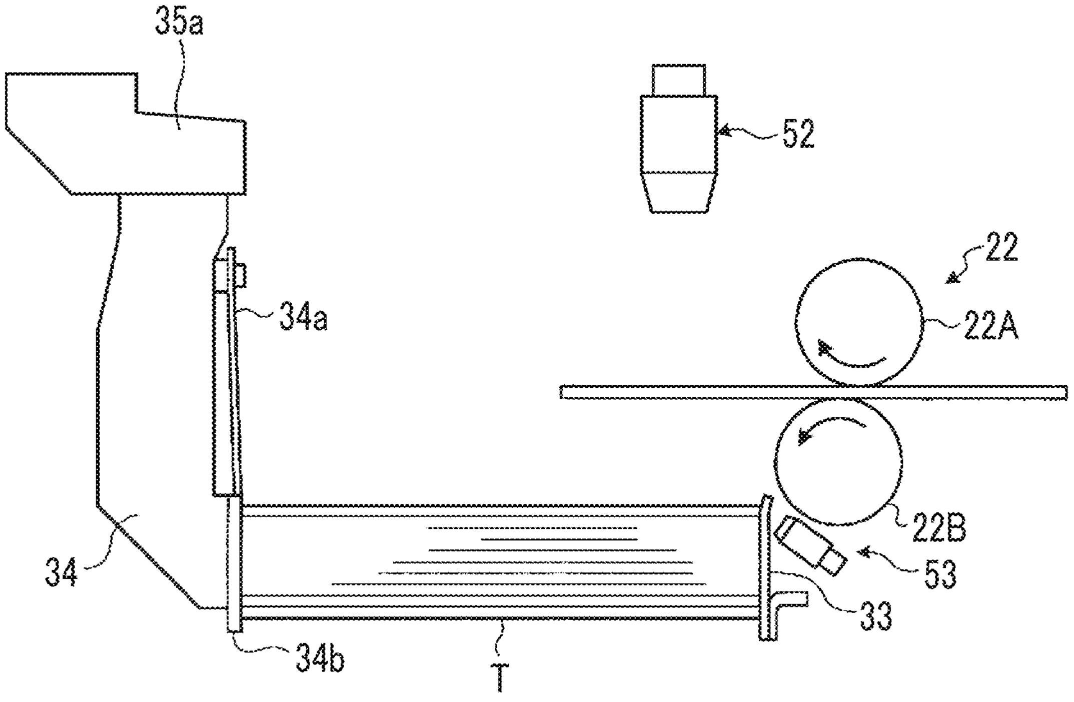
FIG. 10 is a schematic view illustrating operation of the sheet stacking device.
Figure 11:
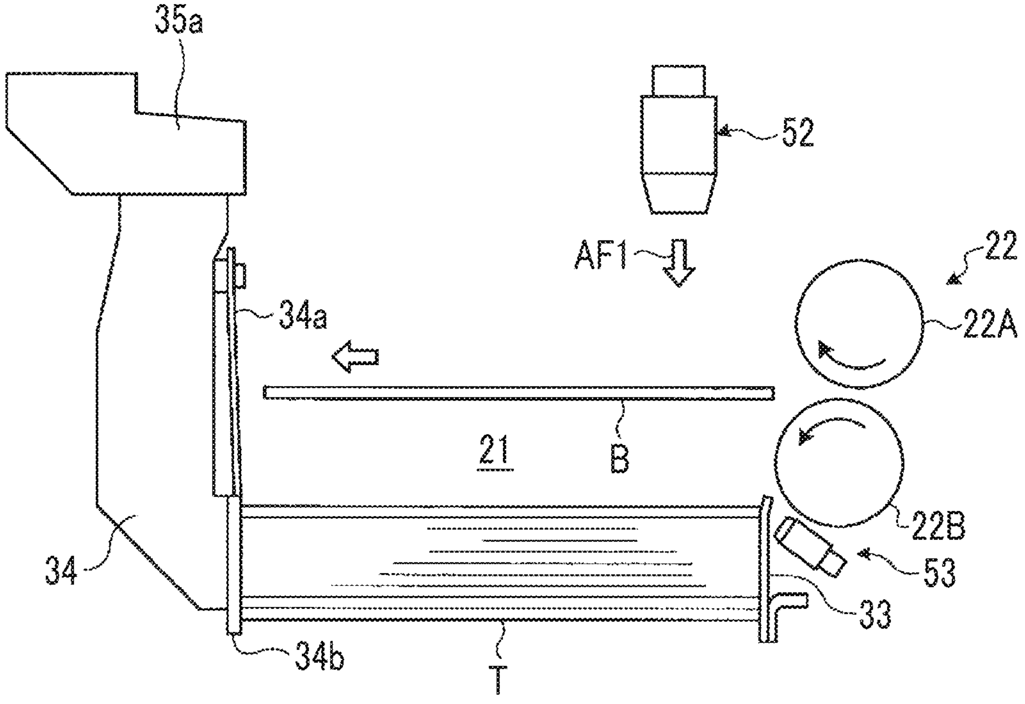
FIG. 11 is a schematic view illustrating the operation of the sheet stacking device.

Thus, when feeding the corrugated box B to the hopper unit 21 by the feeding rolls 22, that is, as illustrated in FIG. 9, when the tip portion of the corrugated box B has reached the hopper unit 21, the operation of the second blowing device 53 starts. Then, as illustrated in FIG. 10, when the tip portion of the corrugated box B has reached the intermediate position of the hopper unit 21 in the feeding direction of the corrugated box B, the operation of the second blowing device 53 is terminated. That is, the second blowing device 53 is operated while the tip portion of the corrugated box B reaches the intermediate position after reaching the hopper unit 21, and the air AF2 is supplied to the space portion between the corrugated box B stacked on the elevator 36 and the corrugated box B fed above the hopper unit 21. The intermediate position is an intermediate position between the spanker 33 and the front stopper 34, and may be shifted to a spanker 33 side or a front stopper 34 side by a predetermined distance. Then, as illustrated in FIG. 11, a negative pressure is eliminated by supplying the air AF2 to the space portion between the corrugated box B stacked on the elevator 36 and the corrugated box B fed above the hopper unit 21, and the behavior of the corrugated box B fed above the hopper unit 21 is stable.

In addition, when the tip portion of the corrugated box B reaches the intermediate position of the hopper unit 21 in the feeding direction of the corrugated box B, the operation of the first blowing device 52 starts. When all of the corrugated boxes B reach the hopper unit 21, the operation of the first blowing device 52 is terminated. That is, the first blowing device 52 is operated while all of the corrugated boxes B reach the hopper unit 21 after the tip portion of the corrugated box B reaches the intermediate position, and the air AF1 is supplied to a rear part of the corrugated box B fed above the hopper unit 21, as illustrated in FIG. 10. When the front end of the corrugated box B approaches the flexible stop plate 34*a* of the front stopper 34, the air AF1 acts on the rear end and the corrugated box B is pressed downward.

Figure 12:
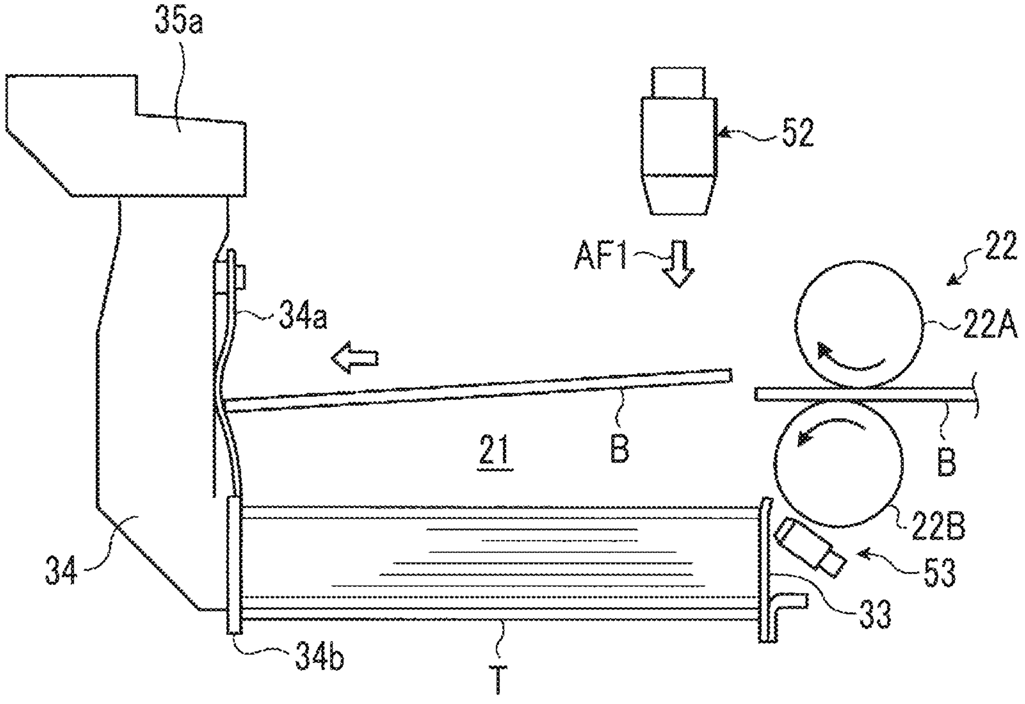
FIG. 12 is a schematic view illustrating the operation of the sheet stacking device.
Figure 13:
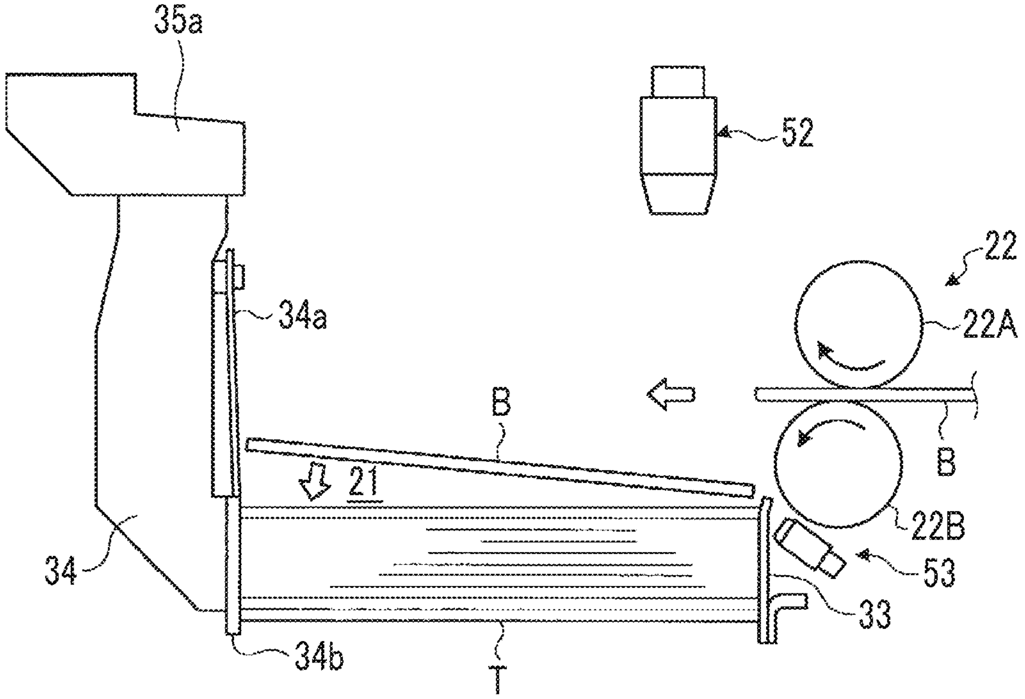
FIG. 13 is a schematic view illustrating the operation of the sheet stacking device.

After then, as illustrated in FIG. 12, the front end of the corrugated box B fed to the upper space of the hopper unit 21 abuts against the flexible stop plate 34*a* of the front stopper 34. As the advancing corrugated box B abuts against the flexible stop plate 34*a* of the front stopper 34, the flexible stop plate 34*a* flexes and absorbs kinetic energy of the corrugated box B to decelerate movement of the corrugated box B. After then, as illustrated in FIG. 13, the rear end of the corrugated box B is pressed downward by the air AF1 from the first blowing device 52. The corrugated box B is lowered to the hopper unit 21 in a slightly backward-lean posture, and is appropriately stacked as the rear end thereof abuts against the spanker 33.

Figure 14:
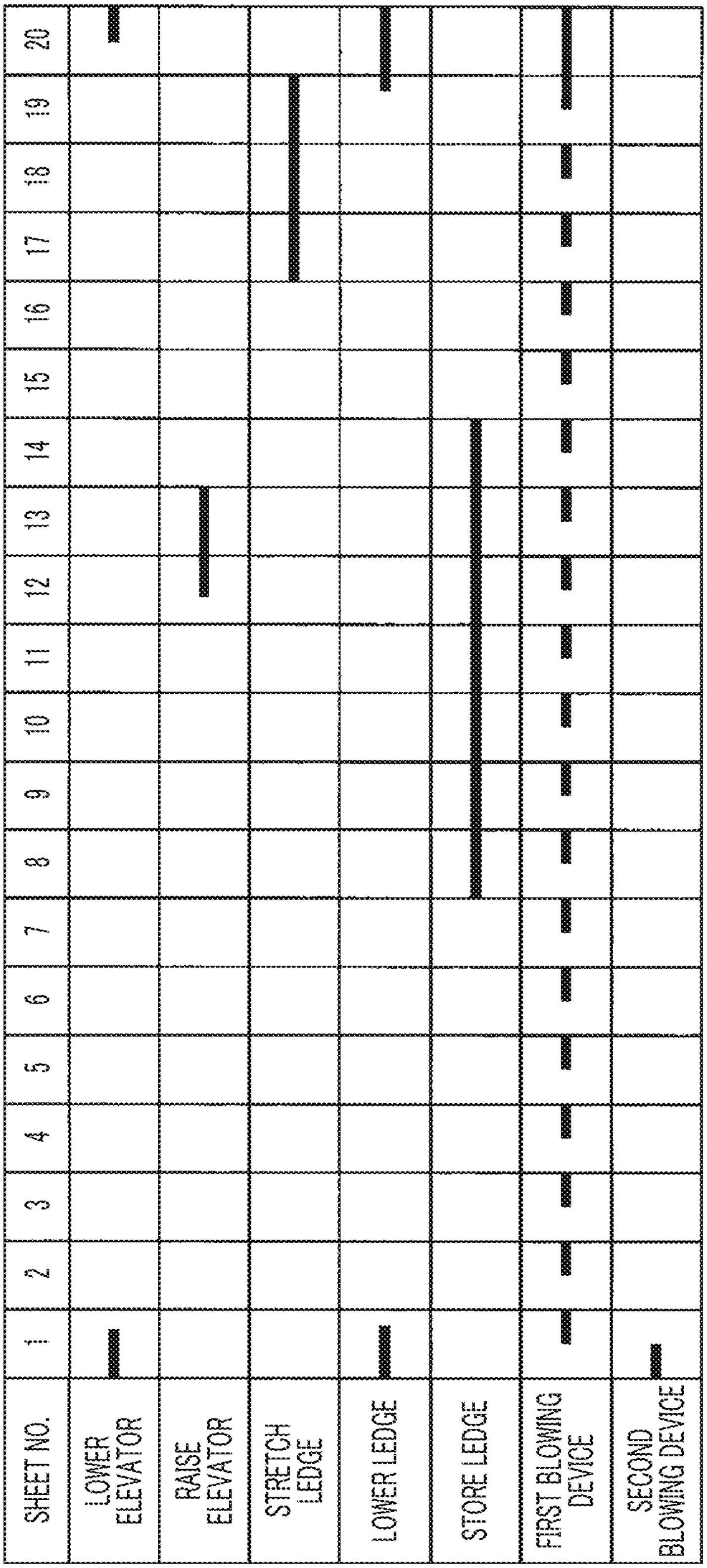
FIG. 14 is a timing chart showing the operation of the sheet stacking device.
Figure 15:
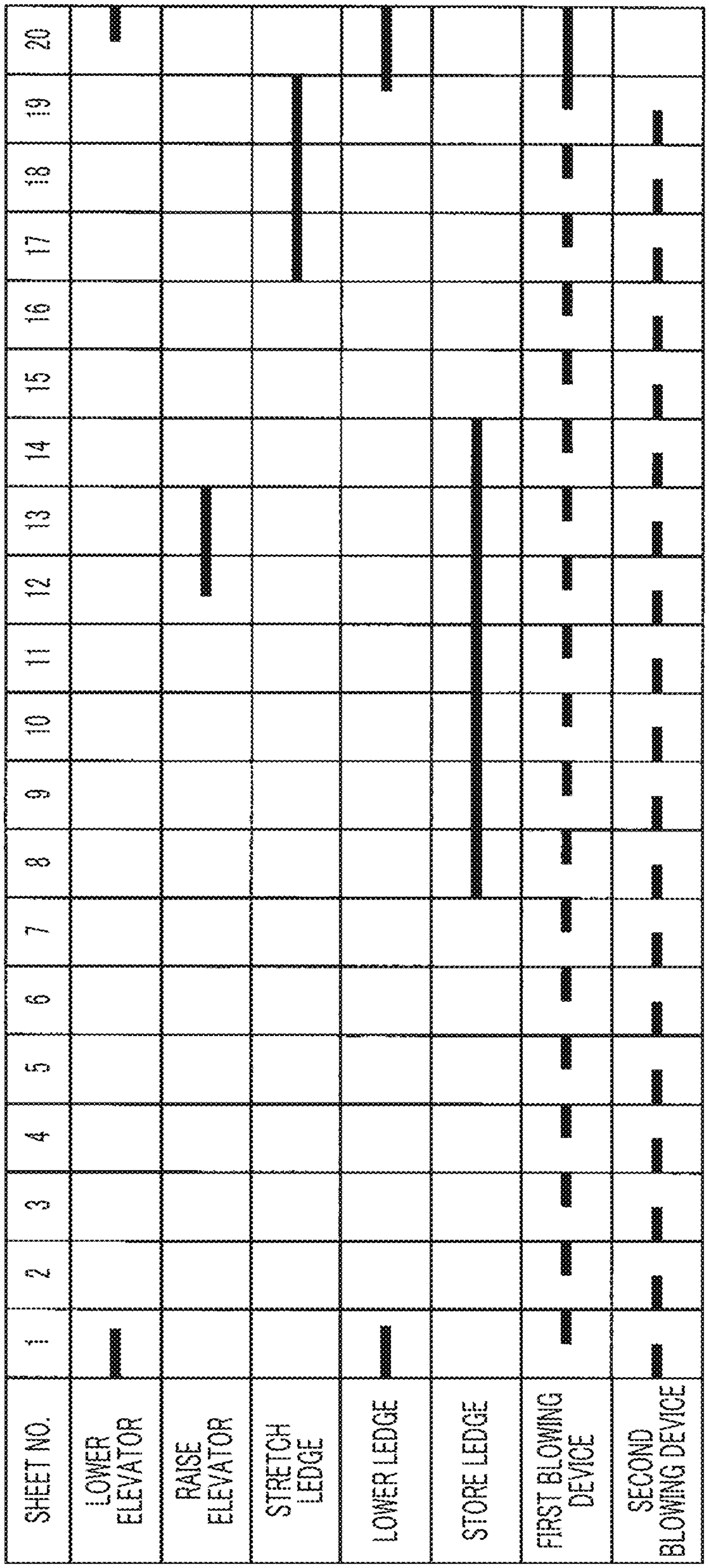
FIG. 15 is a timing chart showing a modification example of the operation of the sheet stacking device.

In addition, when the sheet stacking device 20 stacks a predetermined number (20 in the present embodiment) of corrugated boxes B, which is set in advance, the elevator lowers the corrugated boxes B as one stack T, and discharges the stack T to the outside. The control device 24 controls the first blowing device 52 and the second blowing device 53 differently for each number of corrugated boxes B continuously fed to the hopper unit 21 by the feeding rolls 22. FIG. 14 is a timing chart showing the operation of the sheet stacking device, and FIG. 15 is a timing chart showing a modification example of the operation of the sheet stacking device.

As illustrated in FIGS. 2 and 14, first, when feeding the first corrugated box B to the hopper unit 21, the stack T which is already obtained before by stacking a predetermined number (20) of corrugated boxes B is lowered with the elevator 36. For that reason, the upper space of the elevator 36, that is, the volume of the hopper unit 21 increases, and a negative pressure is generated in the hopper unit 21. At this time, the second blowing device 53 is operated. Then, the negative pressure is eliminated by increasing the air AF2 with respect to the hopper unit of which the volume has increased. As a result, no negative pressure acts on the corrugated box B fed above the hopper unit 21, and the corrugated box B having stable behavior is appropriately landed on the ledge 37 which is stretched and lowered.

In addition, after the first corrugated box B is fed to the hopper unit 21 and the operation of the second blowing device 53 is stopped, the first blowing device 52 is operated. Then, when the front end of the corrugated box B has approached the flexible stop plate 34*a* of the front stopper 34, the rear end thereof is pressed downward by the air AF1. For that reason, the rear end of the corrugated box B abuts against the abutting surface 33*a* of the spanker 33, and lands appropriately on the ledge 37.

Next, when feeding the second corrugated box B to the hopper unit 21, after the lowering of the elevator 36 is terminated and the elevator 36 is stopped, the upper space of the elevator 36, that is, the volume of the hopper unit 21 does not change, and a negative pressure is not generated in the hopper unit 21. For that reason, the second blowing device 53 remains stopped. On the other hand, when the second corrugated box B is fed to the hopper unit 21, the first blowing device 52 is operated, and the corrugated box B appropriately lands on the ledge 37 just as the first corrugated box B. Thereafter, the same applies to the third corrugated box B to the nineteenth corrugated box B.

In addition, when feeding the eighth corrugated box B to the hopper unit 21, the storing of the ledge 37 is started. The ledge 37 is stored from the eighth corrugated box B to the fourteenth corrugated box B, and at this time, another ledge (not illustrated) supports the plurality of stacked corrugated boxes B from below. On the other hand, when the first corrugated box B to the eleventh corrugated box B are discharged as the stack T at a lowering position and the twelfth corrugated box B is fed to the hopper unit 21, the elevator 36 starts rising. Then, when feeding the fourteenth corrugated box B to the hopper unit 21, the elevator 36 supports the plurality of stacked corrugated boxes B once the ledge 37 is completely stored.

On the other hand, when feeding the seventeenth corrugated box B to the hopper unit 21, the ledge 37 starts stretching from a storing position as preparation for receiving the next first corrugated box B. Then, when feeding the nineteenth corrugated box B to the hopper unit 21, the ledge 37 stops at a stretching position, and is lowered to a position for receiving the next first corrugated box B. In addition, when the twentieth corrugated box B is fed to the hopper unit 21, the elevator 36 also starts lowering.

Here, when the twentieth corrugated box B is fed to the hopper unit 21, there is a possibility that the twentieth corrugated box B comes into contact with the ledge 37 since the ledge 37 is at the stretching position. For that reason, the first blowing device 52 is operated immediately after a tip portion of the twentieth corrugated box B has reached the hopper unit 21, and the air AF1 is blown to the upper surface of the corrugated box B once the tip portion of the twentieth corrugated box B has reached the hopper unit 21. In addition, when the twentieth corrugated box B is fed to the hopper unit 21, the second blowing device 53 is not operated. Then, since the air AF2 is not supplied from the second blowing device 53 to the hopper unit 21, the twentieth corrugated box B starts lowering toward the elevator 36 at an early stage, avoids coming into contact with the ledge 37, and appropriately lands on an upper surface of the nineteenth corrugated box B stacked on the elevator 36.

The operation and control of the second blowing device 53 by the above-described control device 24 is performed such that the second blowing device 53 is operated only when the first corrugated box B is fed to the hopper unit 21 and the second blowing device 53 is not operated when the second and subsequent corrugated boxes B are fed to the hopper unit 21. However, the operation and control of the second blowing device 53 by the control device 24 is not limited to the above-described configuration.

As illustrated in FIGS. 2 and 15, when feeding the first corrugated box B to the hopper unit 21, the elevator 36 is lowered with the stack T and a negative pressure is generated in the hopper unit 21. At this time, operating the second blowing device 53 to eliminate the negative pressure is the same as the above-described operation. Then, operating the first blowing device 52 to press down the rear end of the corrugated box B after the first corrugated box B is fed to the hopper unit 21 and the operation of the second blowing device 53 is stopped is also the same as the above-described operation.

However, when the first corrugated box B is lowered, the volume of an upper space of the first corrugated box B increases, and a slight negative pressure is generated. For that reason, also at this time, the second blowing device 53 is operated. Then, the negative pressure is eliminated by increasing the air AF2 with respect to the upper space of the first corrugated box B of which the volume has increased. In this case, the operating time of the second blowing device 53 when feeding the second corrugated box B may be made shorter than the operating time of the second blowing device 53 when feeding the first corrugated box B. As a result, no negative pressure acts on the second corrugated box B fed above the hopper unit 21, and the corrugated box B has stable behavior and appropriately lands on the ledge 37 which is stretched and lowered. The operation of the second blowing device 53 is the same until the nineteenth corrugated box B is fed to the hopper unit 21.

The sheet stacking device of the first embodiment includes the hopper unit 21 for stacking the corrugated box B, the feeding rolls 22 for feeding the corrugated box B to the hopper unit 21, the first blowing device 52 for blowing air toward the corrugated box B fed from above the hopper unit 21 by the feeding rolls 22, and the second blowing device 53 for blowing air between the corrugated box B stacked in the hopper unit 21 and the corrugated box B fed by the feeding rolls 22.

Therefore, when feeding the corrugated box B above the hopper unit by the feeding rolls 22, the second blowing device 53 blows air between the corrugated box B stacked in the hopper unit 21 and the corrugated box B fed by the feeding rolls 22. Then, the air blown from the second blowing device 53 prevents the corrugated box B fed above the hopper unit 21 from being lowered early, and the corrugated box B is stacked in the hopper unit 21 while maintaining a stable posture. As a result, the corrugated box B can be accurately stacked in a predetermined posture by stabilizing the behavior of the corrugated box B being fed from the feeding rolls 22.

In the sheet stacking device of the first embodiment, the control device 24 that operates and controls the first blowing device 52 and the second blowing device 53 is provided, the elevator 36 and the ledge 37, which are receiving tables for receiving and stacking the corrugated box B, are disposed in the hopper unit 21 to be capable of being raised and lowered, and the control device 24 operates the second blowing device 53 when the elevator 36 on which the corrugated box B is stacked is lowered. Therefore, when the elevator 36 for receiving and stacking the corrugated box B is lowered, the volume of the upper space of the elevator 36 increases, and a negative pressure is generated in the hopper unit 21. At this time, since the control device 24 operates the second blowing device 53, the air AF2 is supplied to the upper space, the negative pressure is eliminated, and thus the behavior of the corrugated box B fed above the hopper unit 21 can be stabilized.

In the sheet stacking device of the first embodiment, a predetermined number (for example, 20) of corrugated boxes B, which is set in advance, are stacked on the elevator 36, and the control device 24 operates the second blowing device 53 when the first corrugated box B is fed to the hopper unit 21 by the feeding rolls 22. Therefore, when feeding the first corrugated box B to the hopper unit 21 by the feeding rolls 22, the elevator 36 on which the predetermined number of corrugated boxes B are stacked is lowered and a negative pressure is generated. For that reason, the negative pressure generated in the hopper unit 21 is eliminated by operating the second blowing device 53 when the first corrugated box B is fed to the hopper unit 21, and thus the behavior of the corrugated box B fed above the hopper unit 21 can be stabilized.

In the sheet stacking device of the first embodiment, the control device 24 stops the operation of the second blowing device 53 when the last corrugated box B is fed to the hopper unit 21 by the feeding rolls 22. Therefore, when the last corrugated box B is fed to the hopper unit 21 by the feeding rolls 22, it is necessary for the ledge 37, which is a peripheral device, to prepare for receiving the first corrugated box B in the next step. For that reason, unnecessary air blowing from the second blowing device 53 is stopped by stopping the operation of the second blowing device 53 when the last corrugated box B is fed to the hopper unit 21, and thus contact between the ledge 37 and the last corrugated box B can be prevented.

In the sheet stacking device of the first embodiment, when feeding the corrugated box B to the hopper unit 21 by the feeding rolls 22, the control device 24 starts the operation of the second blowing device 53 if the tip portion of the corrugated box B reaches the hopper unit 21. The control device 24 terminates the operation of the second blowing device 53 if the tip portion of the corrugated box B reaches the intermediate position of the hopper unit 21 in the feeding direction of the corrugated box B. Therefore, by appropriately eliminating a negative pressure with the air AF2 from the second blowing device 53 and stopping the unnecessary blowing of the air AF2, the behavior of the corrugated box B can be appropriately stabilized.

In the sheet stacking device of the first embodiment, the second blowing device 53 blows air toward the corrugated box B fed by the feeding roll 22. Therefore, by blowing air to the lower surface of the corrugated box B falling to the hopper unit 21, the behavior of the corrugated box B at the time of lowering can be stabilized.

In the sheet stacking device of the first embodiment, the second blowing device 53 is provided on the upstream side of the hopper unit 21 in the feeding direction of the corrugated box B. Therefore, a lower space of the feeding rolls 22 can be effectively used as a disposition space for the second blowing device 53, and an increase in the size of the device can be prevented.

In the sheet stacking device of the first embodiment, the second blowing device 53 is provided on the reciprocable spanker 33. Therefore, air can be efficiently blown from the second blowing device to the corrugated box B without receiving an effect of reciprocation of the spanker 33. Without providing the second blowing device 53 on the spanker 33, the second blowing device 53 may be movably supported using another moving device. In addition, the second blowing device 53 may be fixed, for example, to the frames 31.

In the sheet stacking device of the first embodiment, the through-holes 62 that face an air blowing direction of the second blowing device 53 are formed in the spanker 33. Therefore, since the through-holes 62 are formed in the spanker 33, without the air AF2 from the second blowing device 53 being blocked by the spanker 33, the air can be preferably blown to the corrugated box B in the hopper unit 21 from the second blowing device 53.

In the sheet stacking device of the first embodiment, the cutout portions 63 that face the air blowing direction of the second blowing device 53 are formed in the spanker 33.

Therefore, since the cutout portions 63 are formed in the spanker 33, without the air AF2 from the second blowing device 53 being blocked by the spanker 33, the air can be preferably blown to the corrugated box B from the second blowing device 53.

In the sheet stacking device of the first embodiment, the control device 24 operates the first blowing device 52 if the tip portion of the corrugated box B reaches the intermediate position of the hopper unit 21 in the feeding direction of the corrugated box B when feeding the corrugated box B to the hopper unit 21 by the feeding rolls 22 and operates the first blowing device if the tip portion of the corrugated box B reaches the hopper unit 21 when feeding the last corrugated box B to the hopper unit 21 by the feeding rolls 22. Therefore, since the first blowing device 52 is operated when the tip portion of the corrugated box B reaches the intermediate position of the hopper unit 21, the air AF1 from the first blowing device 52 presses down the rear end of the corrugated box B. Consequently, contact with the subsequent corrugated box B is prevented, and the corrugated box B can be accurately stacked in the hopper unit 21. In addition, when the last corrugated box B is fed to the hopper unit by the feeding rolls 22, it is necessary for the ledge 37, which is a peripheral device, to prepare for receiving the first corrugated box B in the next step. For that reason, as the first blowing device is operated when the tip portion of the last corrugated box B reaches the hopper unit 21, the last corrugated box B is stacked in the hopper unit 21 at an early stage due to the air AF1 from the first blowing device 52, and contact between the ledge 37 and the last corrugated box B can be prevented.

Additionally, the counter ejector of the first embodiment is provided with the sheet stacking device 20. Therefore, in the sheet stacking device 20, the second blowing device 53 blows air between the corrugated box B stacked in the hopper unit 21 and the corrugated box B fed by the feeding rolls 22. Then, the air blown from the second blowing device 53 prevents the corrugated box B fed above the hopper unit 21 from being lowered early, and the corrugated box B is stacked in the hopper unit 21 while maintaining a stable posture. As a result, the corrugated box B can be accurately stacked in a predetermined posture by stabilizing the behavior of the corrugated box B being fed from the feeding rolls 22.

Additionally, the box making machine of the first embodiment is provided with the feeding section 11, the printing section 12, the slotter creaser section 13, the die cutting section 14, the folder gluer section 15, and the counter ejector section 16, and the counter ejector section 16 is provided with the sheet stacking device 20. Therefore, printing is performed on the corrugated sheet S from the feeding section 11 by the printing section 12, creasing and grooving are performed by the slotter creaser section 13, folding and joining ends together to form the corrugated box B is performed by the folder gluer section 15, and the corrugated box B is stacked while being counted by the counter ejector section 16. At this time, in the counter ejector section 16, when the corrugated box B is fed above the hopper unit by the feeding rolls 22, the second blowing device 53 blows air between the corrugated box B stacked in the hopper unit 21 and the corrugated box B fed by the feeding rolls 22. Then, the air blown from the second blowing device 53 prevents the corrugated box B fed above the hopper unit 21 from being lowered early, and the corrugated box B is stacked in the hopper unit 21 while maintaining a stable posture. As a result, the corrugated box B can be accurately stacked in a predetermined posture by stabilizing the behavior of the corrugated box B being fed from the feeding rolls 22.

Second Embodiment

Figure 16:
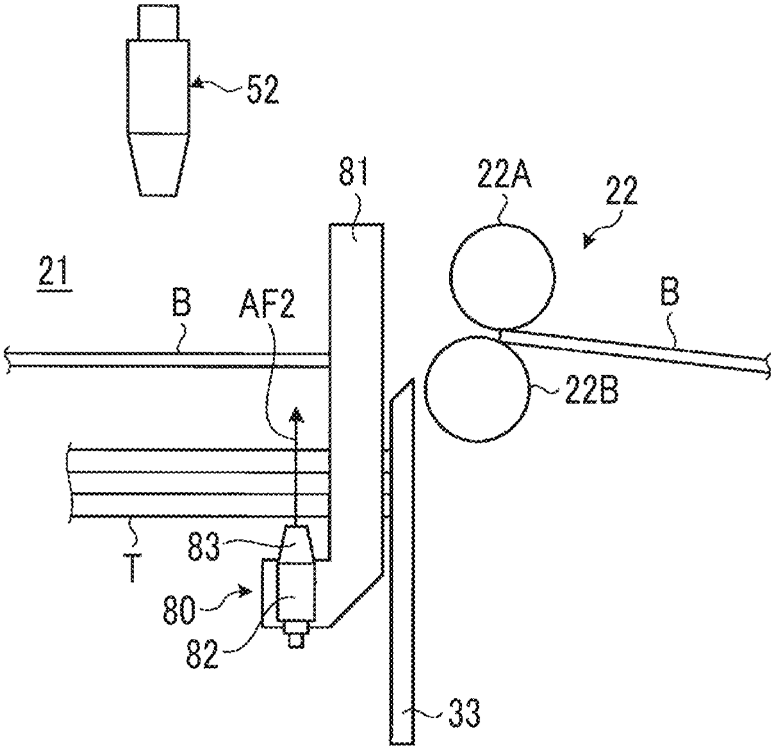
FIG. 16 is a side view illustrating a second blowing device of a sheet stacking device of a second embodiment.
Figure 17:
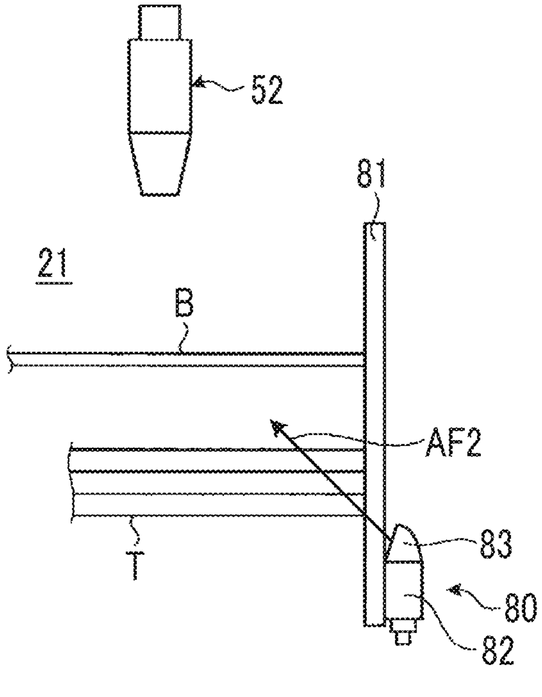
FIG. 17 is a rear view illustrating the second blowing device.

FIG. 16 is a side view illustrating a second blowing device of a sheet stacking device of a second embodiment, and FIG. 17 is a rear view illustrating the second blowing device. A basic configuration of the second embodiment is the same as the above-described first embodiment, description will be made with reference to FIG. 2, the members having the same functions as those in the first embodiment are denoted by the same reference signs, and detailed description thereof will be omitted.

As illustrated in FIGS. 2 and 16, the sheet stacking device 20 of the second embodiment has the hopper unit 21, the feeding rolls (feeding unit) 22, the blowing device 23, and the control device 24. The blowing device 23 has the first blowing device 52 and a second blowing device 80.

As illustrated in FIGS. 16 and 17, the second blowing device 80 is provided on one side or both sides of the hopper unit 21 in the horizontal direction intersecting the feeding direction of the corrugated box B. The side frames 41 (see FIG. 2) are provided such that a side guide (side end positioning member) 81 that positions side ends of the stack T of the corrugated boxes B is movable along the horizontal direction intersecting the feeding direction of the corrugated box B. The second blowing device 80 is provided on the side guide 81.

The second blowing device 80 is constituted of spraying nozzles 82. The spraying nozzles 82 are directly fixed to an opposite side to the hopper unit 21 with respect to the side guide 81. In addition, spraying portions of the spraying nozzles 82 are fixed to guides 83, and the spraying direction of the air AF2 is inclined upward at a predetermined angle with respect to the horizontal direction and the vertical direction. The spraying nozzles 82 may not be directly fixed to the side guide 81. In addition, the spraying nozzles 82 may be disposed with a predetermined interval in the feeding direction of the corrugated box B.

Although not illustrated, the spraying nozzles 82 are connected to the compressor via the pipe, and blow the air AF2 to the space portion between the corrugated box B stacked in the hopper unit 21 and the corrugated box B fed to the hopper unit 21 by the feeding rolls 22. In this case, since the spraying direction of the air AF2 is inclined upward at a predetermined angle with respect to the horizontal direction and the vertical direction due to the guides 83 fixed to the spraying portions, the spraying nozzles 82 can blow the air AF2 toward the lower surface of the corrugated box B located above the hopper unit 21.

As described above, in the sheet stacking device of the second embodiment, the second blowing device 80 is provided on at least one side of the hopper unit 21 in the horizontal direction intersecting the feeding direction of the corrugated box B. Therefore, since the second blowing device 80 is provided on the side of the hopper unit 21, a wide space can be used as a disposition space for the second blowing device 80, the second blowing device 80 can be disposed at a better position, and the disposition space can be effectively used.

In the sheet stacking device of the second embodiment, the second blowing device 80 is provided on the movable side guide 81. Therefore, even if the position of the side guide 81 is adjusted by changing the size of the corrugated box B, the position of the second blowing device 80 is simultaneously adjusted, and operability can be improved. Without providing the second blowing device 80 on the side guide 81, the second blowing device 80 may be movably supported using another moving device. In addition, the second blowing device 80 may be fixed to the side frames 41.

The air blowing direction of the air AF2 from the second blowing devices 53 and 80 is an obliquely upward direction in the above-described embodiments, but is not limited to the directions. In the second blowing device of the present invention, the blowing direction may be any direction insofar as blowing air between the box making sheet material stacked in the hopper unit and the box making sheet material fed by the feeding unit is possible, and the air blowing direction of the air AF2 may be, for example, the horizontal direction or an obliquely downward direction.

Additionally, in the above-described embodiments, the box making machine 10 is constituted of the feeding section 11, the printing section 12, the slotter creaser section 13, the die cutting section 14, the folder gluer section 15, and the counter ejector section 16. However, in a case where hand holes are unnecessary for the corrugated sheet S, the die cutting section 14 may be eliminated.

REFERENCE SIGNS LIST

11: FEEDING SECTION
12: PRINTING SECTION
13: SLOTTER CREASER SECTION
14: DIE CUTTING SECTION
15: FOLDER GLUER SECTION
16: COUNTER EJECTOR SECTION (COUNTER EJECTOR)
20: SHEET STACKING DEVICE
21: HOPPER UNIT
22: FEEDING ROLL (FEEDING UNIT)
22A: UPPER EJECTION ROLL
22B: LOWER EJECTION ROLL
23: BLOWING DEVICE
24: CONTROL DEVICE
33: SPANKER (CORRECTION PLATE)
34: FRONT STOPPER
35: LEDGE SUPPORT
36: ELEVATOR (RECEIVING TABLE)
37: LEDGE (RECEIVING TABLE)
52: FIRST BLOWING DEVICE
53, 53A, 53B, 80: SECOND BLOWING DEVICE
61, 82: SPRAYING NOZZLE
62: THROUGH-HOLE
63: CUTOUT PORTION
64,83: GUIDE
71: SPRAY PIPE
72: OPENING AND CLOSING DAMPER
73: SPRAY PORT
81: SIDE GUIDE
AF1, AF2: AIR
B: CORRUGATED BOX (BOX MAKING SHEET MATERIAL)
S: CORRUGATED SHEET
T: STACK

The invention claimed is:

1. A sheet stacking device comprising:

a hopper unit in which a box making sheet material is stacked;

a feeding unit that feeds the box making sheet material to the hopper unit;

a first blowing device that blows air from above the hopper unit toward the box making sheet material fed by the feeding unit; and a second blowing device that blows air between the box making sheet material stacked in the hopper unit and the box making sheet material fed by the feeding unit, wherein a control device that operates and controls the first blowing device and the second blowing device is provided, a receiving table for receiving and stacking a box making sheet material is disposed in the hopper unit, the receiving table is capable of being raised and lowered by a lifting device, and the control device activates, from a stopped state, the second blowing device in response to the receiving table in which the box making sheet material is stacked being lowered by a lifting device.

2. The sheet stacking device according to claim 1, wherein the receiving table is used for stacking a predetermined number of the box making sheet materials, which is set in advance, and the control device operates the second blowing device when at least a first box making sheet material, among the predetermined number of box making sheet materials, is fed to the hopper unit by the feeding unit.

3. The sheet stacking device according to claim 2, wherein the receiving table is used for stacking the predetermined number of box making sheet materials, which is set in advance, and the control device stops operation of the second blowing device when at least a last box making sheet material, among the predetermined number of box making sheet materials, is fed to the hopper unit by the feeding unit.

4. The sheet stacking device according to claim 1, wherein when feeding the box making sheet material to the hopper unit by the feeding unit, the control device starts operation of the second blowing device if a tip portion of the box making sheet material reaches the hopper unit, and terminates the operation of the second blowing device if the tip portion of the box making sheet material reaches an intermediate position of the hopper unit in a feeding direction of the box making sheet material.

5. The sheet stacking device according to claim 1, wherein the second blowing device blows air toward the box making sheet material fed by the feeding unit.

6. The sheet stacking device according to claim 1, wherein the second blowing device is provided on an upstream side of the hopper unit in a feeding direction of the box making sheet material.

7. The sheet stacking device according to claim 6, wherein a correction plate that presses a rear end of the box making sheet material in the hopper unit in a transfer direction is provided to be reciprocable along the feeding direction of the box making sheet material, and the second blowing device is provided on the correction plate.

8. The sheet stacking device according to claim 7, wherein a through-hole that faces an air blowing direction of the second blowing device is formed in the correction plate.

9. The sheet stacking device according to claim 7, wherein a cutout portion that faces an air blowing direction of the second blowing device is formed in the correction plate.

10. The sheet stacking device according to claim 1, wherein the second blowing device is provided on at least one side of the hopper unit in a horizontal direction intersecting a feeding direction of the box making sheet material.

11. The sheet stacking device according to claim 10, wherein a side end positioning member that positions a side end of the box making sheet material in the hopper unit is provided to be movable along the horizontal direction intersecting the feeding direction of the box making sheet material, and the second blowing device is provided on the side end positioning member.

12. The sheet stacking device according to claim 1, wherein the receiving table is used for stacking a predetermined number of the box making sheet materials, which is set in advance, and the control device operates the first blowing device if a tip portion of the box making sheet material reaches an intermediate position of the hopper unit in a feeding direction of the box making sheet material when feeding the box making sheet material to the hopper unit by the feeding unit and operates the first blowing device if the tip portion of the box making sheet material reaches the hopper unit when feeding a last box making sheet material, among the predetermined number of box making sheet materials, to the hopper unit by the feeding unit.

13. A counter ejector comprising:

the sheet stacking device according to claim 1, wherein after counting and stacking the box making sheet materials, the box making sheet materials are sorted and discharged in a batch of a predetermined number of the box making sheet materials.

14. A box making machine comprising:

a feeding section that supplies a box making sheet material;

a printing section that performs printing on the box making sheet material;

a slotter creaser section that performs creasing and performs grooving on a surface of the box making sheet material;

a folder gluer section that folds the box making sheet material and joins ends thereof together to form a box member; and a counter ejector section that discharges every predetermined number of the box members after being stacked while being counted, wherein the counter ejector according to claim 13 is applied as the counter ejector section.

* * * * *